United States Patent
Tatsumi

(10) Patent No.: US 9,686,179 B2
(45) Date of Patent: Jun. 20, 2017

(54) NETWORK RELAY SYSTEM AND SWITCHING DEVICE

(71) Applicant: Hitachi Metals, Ltd., Minato-ku, Tokyo (JP)

(72) Inventor: Tomoyoshi Tatsumi, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 306 days.

(21) Appl. No.: 14/308,884

(22) Filed: Jun. 19, 2014

(65) Prior Publication Data

US 2015/0049765 A1 Feb. 19, 2015

(30) Foreign Application Priority Data

Aug. 19, 2013 (JP) ................. 2013-169787

(51) Int. Cl.
| | | |
|---|---|---|
| H04L 12/46 | (2006.01) | |
| H04L 12/709 | (2013.01) | |
| H04L 12/933 | (2013.01) | |

(52) U.S. Cl.
CPC ............ H04L 45/245 (2013.01); H04L 49/10 (2013.01); *Y02B 60/33* (2013.01)

(58) Field of Classification Search
CPC ........ H04L 45/245; H04L 49/01; Y02B 60/33
USPC ....................................... 370/401
See application file for complete search history.

(56) References Cited

U.S. PATENT DOCUMENTS

| | | | |
|---|---|---|---|
| 2003/0108052 A1 | 6/2003 | Inoue et al. | |
| 2009/0135820 A1 | 5/2009 | Suzuki | |
| 2010/0316053 A1* | 12/2010 | Miyoshi | H04L 45/00 370/392 |
| 2012/0128005 A1* | 5/2012 | Tatsumi | H04L 49/15 370/401 |
| 2013/0022047 A1 | 1/2013 | Nakashima et al. | |
| 2016/0014048 A1* | 1/2016 | Tripathi | H04L 49/1507 370/359 |

FOREIGN PATENT DOCUMENTS

| | | |
|---|---|---|
| JP | 2000-13439 A | 1/2000 |
| JP | 2003-174473 A | 6/2003 |
| JP | 2009-130873 A | 6/2009 |
| JP | 2010-288168 A | 12/2010 |
| JP | 2012-114644 A | 6/2012 |
| JP | 2013-25505 A | 2/2013 |

OTHER PUBLICATIONS

Yoshinobu Kato, Server load balancer—Difference in distribution technique and supported protocol—Focus on function to meet the needs, Nikkei Communications, Mar. 20, 2000, vol. 314, pp. 114-123.

Japanese Office Action issued in counterpart Japanese Application No. 2013-169787 dated Oct. 11, 2016 with English-language translation (four (4) pages).

* cited by examiner

*Primary Examiner* — Andrew Lai
*Assistant Examiner* — Albert Shih
(74) *Attorney, Agent, or Firm* — Crowell & Moring LLP

(57) ABSTRACT

Each of the n port switches set LAG to m links which respectively connect the port switch and m fabric switches. For example, the port switch performs a hashing operation for a frame received at a predetermined port and containing a layer 4 port number of an OSI reference model by using the port number, determines one link based on a result of the hashing operation from among the m links to which the LAG is set, and relays the frame to the one link.

5 Claims, 9 Drawing Sheets

FIG. 6A

ADDRESS TABLE

| PORT NO./LAG ID | MAC ADDRESS |
|---|---|
| ⋮ | ⋮ |
| Pu[1] | MA1 |
| ⋮ | ⋮ |
| LAG20 | MA2 |
| ⋮ | ⋮ |

LAG TABLE

| LAG ID | PORT | STATE |
|---|---|---|
| LAG20 | Pf[1] | NORMAL |
| | Pf[2] | NORMAL |
| | ⋮ | ⋮ |
| | Pf[m] | NORMAL |

~44

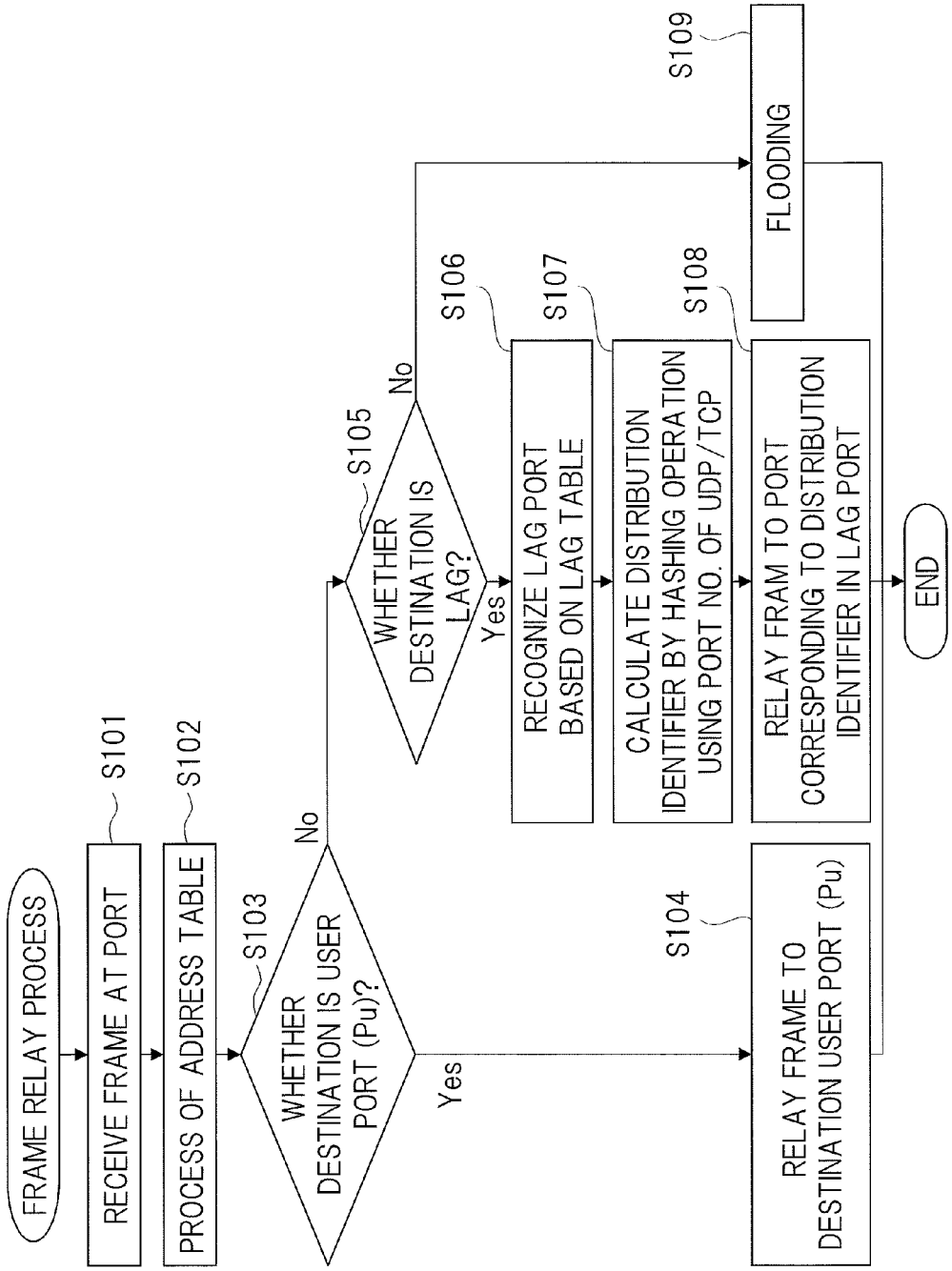

NETWORK RELAY SYSTEM AND SWITCHING DEVICE

CROSS-REFERENCE TO RELATED APPLICATION

The present application claims priority from Japanese Patent Application No. 2013-169787 filed on Aug. 19, 2013, the content of which is hereby incorporated by reference into this application.

TECHNICAL FIELD OF THE INVENTION

The present invention relates to a network relay system and a switching device, for example, a network relay system and a switching device used in a datacenter or the like to which a virtual environment is applied.

BACKGROUND OF THE INVENTION

For example, Japanese Patent Application Laid-Open Publication No. 2012-114644 (Patent Document 1) discloses a method of automatically setting LAG to a plurality of links which connect each interface relay and a plurality of fabric relays in a network relay system including the plurality of fabric relays and the plurality of interface relays. Japanese Patent Application Laid-Open Publication No. 2013-25505 (Patent Document 2) discloses a configuration in which a connection relation between the first level and the second level is different from a connection relation of a regular fat tree in a network device made up of switches having a three-level configuration connected by a fat tree. Japanese Patent Application Laid-Open Publication No. 2010-288168 (Patent Document 3) discloses a method in which each leaf switch transfers a packet received from a terminal to a specific route switch based on a destination address thereof and also transfers a learning packet to a specific route switch based on a source address thereof in a configuration including a plurality of leaf switches and a plurality of route switches relaying the communication therebetween.

SUMMARY OF THE INVENTION

In recent years, in a datacenter or the like, application of a virtual environment using a virtual terminal and a virtual switch has been proceeding. In the virtual environment like this, a technique of flexibly establishing a logical (or virtual) layer 2 (hereinafter, abbreviated as L2) network made up of predetermined virtual terminal and virtual switch on a physical network of existing L2 network and layer 3 (hereinafter, abbreviated as L3) network is needed. As one of these techniques, a network virtualization technique using an overlay method such as VXLAN (Virtual eXtensible Local Area Network), NVGRE (Network Virtualization using Generic Routing Encapsulation) or STT (Stateless Transport Tunneling) has been known.

For example, VXLAN is a tunneling protocol capable of establishing a logical L2 network on a L3 network by encapsulating a L2 frame. Specifically, each virtual terminal is configured so as to belong to a tunnel end point called VTEP (Virtual Tunnel End Point), and the communication between virtual terminals belonging to different VTEPs is carried out through the communication between corresponding VTEPs. At this time, the VTEP encapsulates the L2 frame transmitted from the virtual terminal belonging to the VTEP itself with an outer header including UDP (User Datagram. Protocol) header and transmits it to the VTEP to be a destination.

Meanwhile, for example, as disclosed in the Patent Document 1 and others, a technique of establishing a network relay system by combining a plurality of box-type switching devices instead of a chassis-type switching device has been known. In this network relay system, a plurality of box-type switching devices (here, referred to as port switch) and a plurality of box-type switching devices (here, referred to as fabric switch) which function to relay a frame between the port switches are provided. Each port switch has a link to each of the plurality of fabric switches, and sets a link aggregation group (hereinafter, abbreviated to as LAG) to the plurality of links. In this specification, the network relay system like this is referred to as a box-type fabric system.

In such a box-type fabric system, when a port switch relays each frame received at a predetermined port to another port switch, the port switch relays each frame so as to be properly distributed in the plurality of links to which LAG is set. The distribution in the LAG is performed based on a predetermined distribution rule. However, the studies by the inventor of the present invention have revealed that, when a port switch receives a frame from a tunnel end point such as VTEP mentioned above at a predetermined port, the distribution in LAG is not efficiently performed, with the result that the degradation in communication band may occur.

The present invention has been made in view of the problem mentioned above, and one object of the present invention is to provide a network relay system capable of achieving the improvement in communication band and a switching device used in the network relay system.

The above and other objects and novel characteristics of the present invention will be apparent from the description of the present specification and the accompanying drawings.

The following is a brief description of an outline of the typical embodiment of the invention disclosed in the present application.

The network relay system of the embodiment includes: n (n is an integer of 2 or more) first switching devices; m (m is an integer of 2 or more) second switching devices functioning to relay a frame between the n first switching device; and a plurality of links which connect the m second switching devices and the n first switching devices, respectively. Each of the n first switching devices sets a link aggregation group to m links which connect the first switching device and the m second switching devices. Any one of the n first switching devices includes a LAG distribution control unit which performs a hashing operation for a frame received at a predetermined port and containing a layer 4 port number of an OSI reference model by using the port number and determines one link based on a result of the hashing operation from among the m links to which the link aggregation group is set. Then, any one of the first switching devices relays the frame to the one link determined by the LAG distribution control unit.

The effects obtained by typical embodiments of the invention disclosed in the present application will be briefly described below. That is, it is possible to improve the communication band in a network relay system and a switching device.

BRIEF DESCRIPTIONS OF THE DRAWINGS

FIG. 6A is a schematic diagram showing a configuration example of an address table in FIG. 5;

FIG. 6B is a schematic diagram showing a configuration example of a LAG table in FIG. 5;

FIG. 7 is a flowchart showing a main operation example of a frame processing unit in FIG. 5;

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

Figure 1:
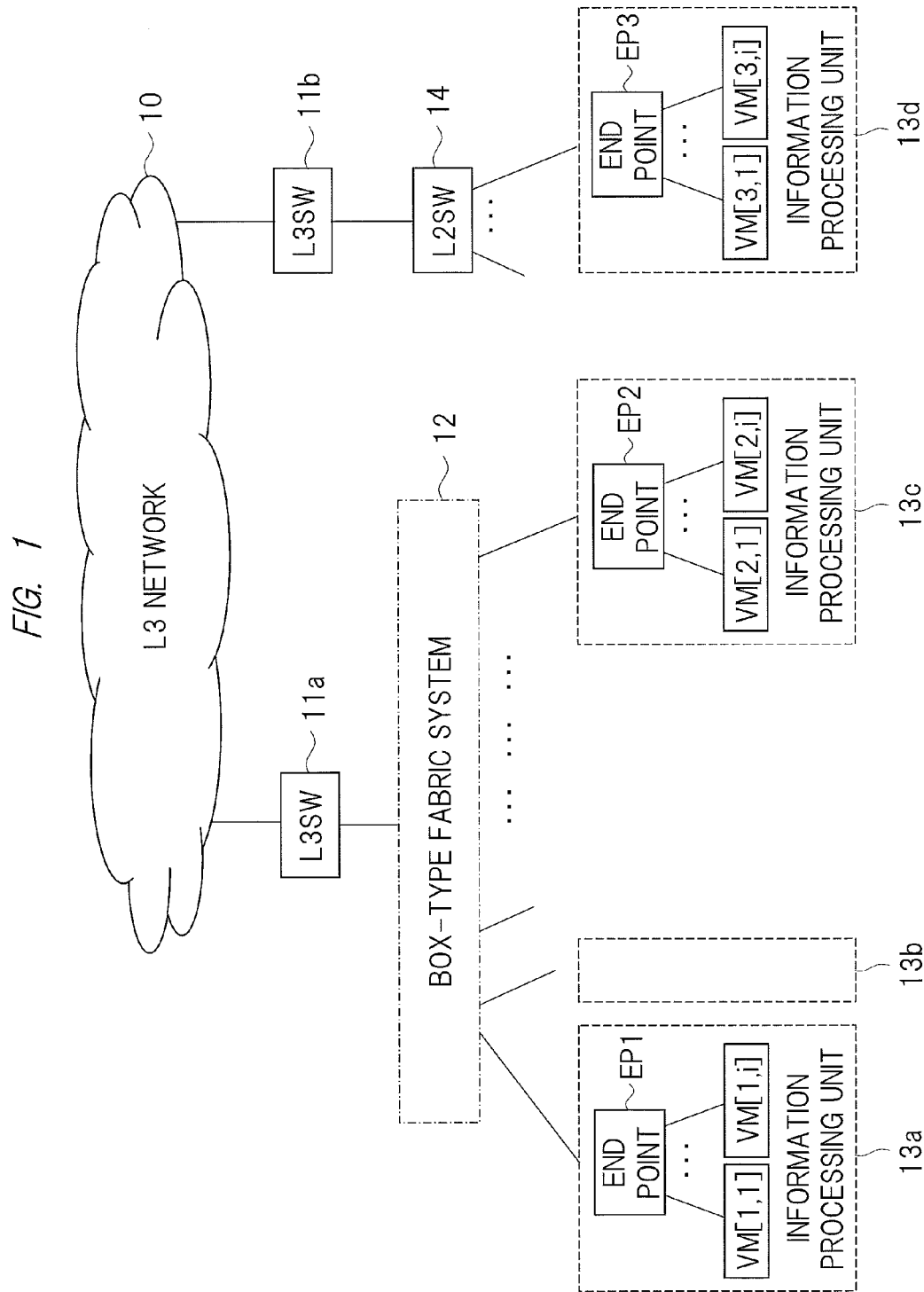
FIG. 1 is a block diagram showing a schematic configuration example of a virtualized network system serving as an application example of a network relay system according to the first embodiment of the present invention.

(First Embodiment)
<<Outline of Virtualized Network System>>
FIG. 1 is a block diagram showing a schematic configuration example of a virtualized network system serving as an application example of a network relay system according to the first embodiment of the present invention. As the network system in FIG. 1, though not particularly limited, a network system such as a datacenter is shown. This network system has a L3 network 10, a plurality of L3 switching devices (L3SW) 11a and 11b, a box-type fabric system 12, a L2 switching device (L2SW) 14 and a plurality of information processing units including information processing units 13a to 13d. The network relay system of the first embodiment is mainly applied to the box-type fabric system 12.

The information processing unit 13a includes a tunnel endpoint EP1 and a plurality (i) of virtual terminals VM[1,1] to VM[1, i] managed by the tunnel endpoint EP1. The tunnel endpoint EP1 corresponds to, for example, VTEP in the case of the VXLAN mentioned above. The information processing unit 13a is made up of, for example, a rack-type server, and the tunnel end point EP1 can be implemented on a software basis or by a ToR (Top of Rack) physical switch. Similarly, the information processing unit 13c includes a tunnel end point EP2 and a plurality (i) of virtual terminals VM[2,1] to VM[2,i], and the information processing unit 13d includes a tunnel end point EP3 and a plurality (i) of virtual terminals VM[3,1] to VM[3,i].

Hereinafter, the virtual terminals VM[1,1] to VM[1,i], VM[2,1] to VM[2, i] and VM[3,1] to VM[3, i] are collectively referred to as a virtual terminal VM, and the tunnel end points EP1 to EP3 are collectively referred to as a tunnel end point EP. Also, the information processing units 13a to 13d are collectively referred to as an information processing unit 13.

In this example, the plurality of information processing units 13 including the information processing units 13a to 13c and the L3 switching device (L3SW) 11a are connected to the box-type fabric system 12, and although details thereof will be described later, the box-type fabric system 12 functions to relay the frame therebetween. In this example, the plurality of information processing units 13 including the information processing unit 13d and the L3 switching device (L3SW) 11b are connected to the L2 switching device (L2SW) 14, and the L2 switching device (L2SW) 14 functions to relay the frame therebetween. It is also possible to apply the same configuration as the box-type fabric system 12 to the L2 switching device (L2SW) 14. The L3 switching devices (L3SW) 11a and 11b are connected to the L3 network 10, and the L3 network 10 relays the frame (packet) therebetween. Although not shown, the L3 network 10 can include other L3 switching devices therein.

In the network system like this, for example, it is sometimes desired to establish a logical (virtual) L2 network between the information processing unit 13a and the information processing unit 13d through the L3 network 10. In such a case, it is advantageous to use the tunneling protocol represented by VXLAN or the like. In the VXLAN, the logical (virtual) L2 network is distinguished by a VXLAN identifier. In the VXLAN, a multicast group is established in advance for each of the VXLAN identifiers by using a multicast protocol such as IGMP (Internet Group Management Protocol) or PIM (Protocol Independent Multicast), so that the logical (virtual) L2 network is established through the L3 network 10.

When the tunnel end point EP (that is, VTEP) receives the L2 frame (hereinafter, abbreviated as frame) transmitted from the virtual terminal VM under itself, the tunnel end point EP selects the process to be executed depending on whether or not the tunnel end point EP recognizes a tunnel end point EP to which a virtual terminal VM serving as the destination of the frame belongs. When the tunnel end point EP recognizes the tunnel end point EP serving as the destination, it encapsulates the frame with UDP and then transmits it by unicast to the tunnel end point EP serving as the destination. On the other hand, when the tunnel end point EP does not recognize the tunnel end point EP serving as the destination, it encapsulates the frame with a multicast address and then transmits it by multicast to the multicast group to which the virtual terminal VM serving as a source belongs.

In the network system like this, since communications between a large number of virtual terminals VM are carried out, it is important to efficiently distribute the load. Thus, it is advantageous to use the network relay system of the first embodiment described later.

<<Configuration of Network Relay System and Premise Operation>>

Figure 2:
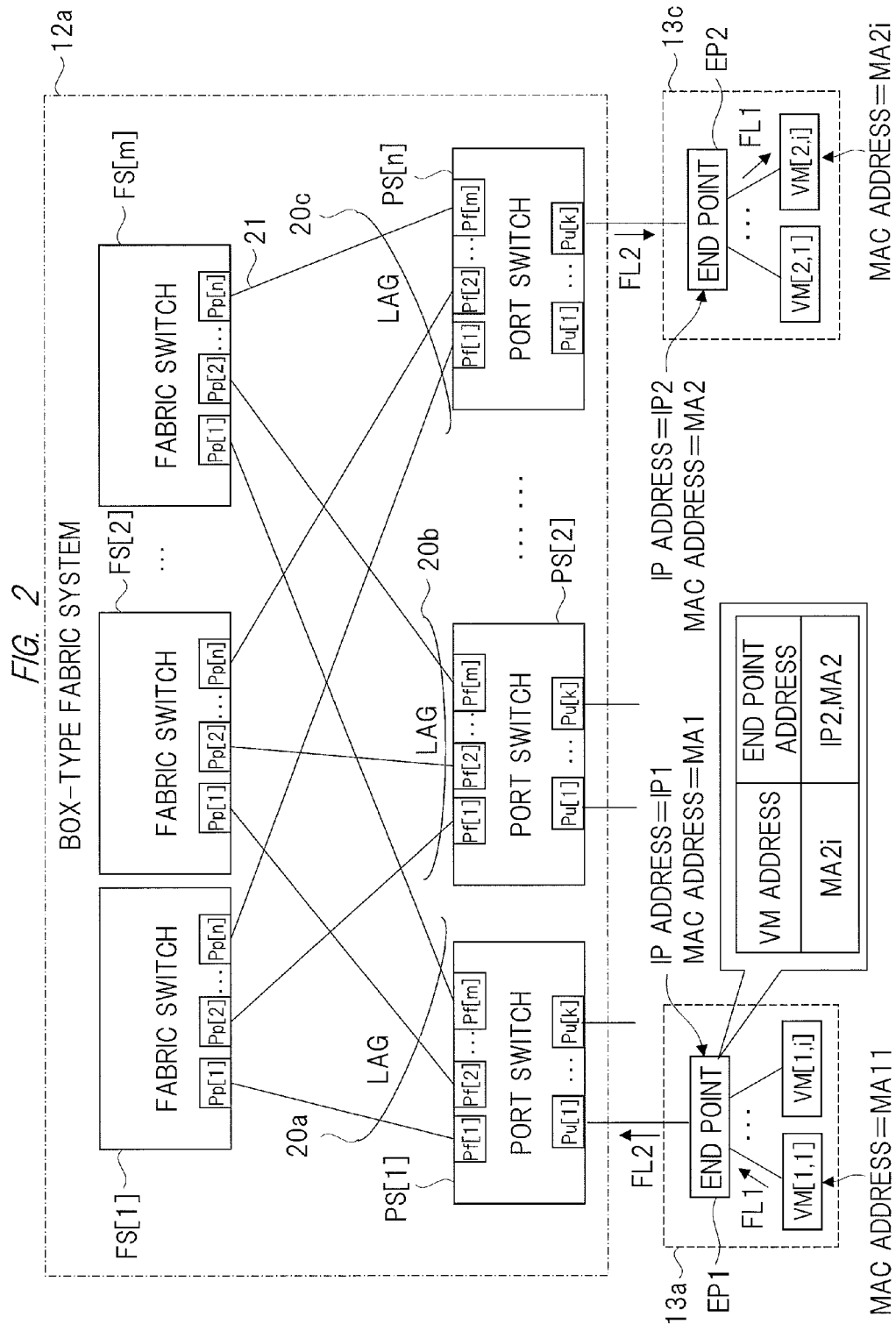
FIG. 2 is a block diagram showing a configuration example of a box-type fabric system in FIG. 1 and an operation example to be a premise thereof.

FIG. 2 is a block diagram showing a configuration example of the box-type fabric system in FIG. 1 and an operation example to be a premise thereof. The box-type fabric system (network relay system) 12a shown in FIG. 2 includes n (n is an integer of 2 or more) port switches (first switching device) PS[1] to PS[n], m (m is an integer of 2 or more) fabric switches (second switching device) FS[1] to FS[m], and a plurality of links 21. The m fabric switches FS[1] to FS[m] function to relay the frame between n port switches PS[1] to PS[n]. The plurality of links 21 connect the m fabric switches and the n port switches, respectively.

The n port switches PS[1] to PS[n] and the m fabric switches FS[1] to FS[m] are each made up of a box-type switching device. Each of the n port switches PS[1] to PS[n] includes m fabric-switch ports Pf[1] to Pf[m] and k (k is an integer of 1 or more) user ports Pu[1] to Pu[k]. Each of the m fabric switches FS[1] to FS[m] includes n port-switch ports Pp[1] to Pp[n]. Each of the n port switches PS[1] to PS[n] sets LAG to m links 21 which connect the port switch and the m fabric switches FS[1] to FS[m].

Hereinafter, the port switches PS[1] to PS[n] are collectively referred to as a port switch PS, and the fabric switches FS[1] to FS[m] are collectively referred to as a fabric switch FS. Also, the fabric-switch ports Pf[1] to Pf[m] are collectively referred to as a fabric-switch port Pf, the user ports Pu[1] to Pu[k] are collectively referred to as a user port Pu, and the port-switch ports Pp[1] to Pp[n] are collectively referred to as a port-switch port Pp.

For example, in the port switch PS[1], the m fabric-switch ports Pf[1] to Pf[m] and the port-switch ports Pp[1] of the m fabric switches FS[1] to FS[m] are connected by m links 21. The port switch PS[1] sets LAG 20a to the m links 21. Note that the link 21 means an assembly including a communication line and ports at its both ends (that is, the fabric-switch port Pf and the port-switch port Pp). Similarly, the port switch PS[2] sets LAG 20b to the m links 21 which connect the port switch PS[2] and the m fabric switches FS[1] to FS[m], and the port switch PS[n] sets LAG 20c to the m links 21 which connect the port switch PS[n] and the m fabric switches FS[1] to FS[m].

In the case of using the box-type fabric system 12a described above, the load distribution and redundancy in the LAG can be achieved in accordance with the LAG. For example, when it is desired to expand the communication band, it can be achieved by adding the fabric switch FS, and the expansion of the communication band can be easily achieved at low cost. Also, the number of ports (that is, user ports Pu) can be easily increased at low cost by adding the port switch PS. As a result, in the case of using this system, the flexible system in compliance with the demands from a user can be established at low cost compared with the case of using a system made up of a chassis-type switching device. The L3 switching device (L3SW) 11a shown in FIG. 1 is connected to the user port Pu of any one of the port switches PS[1] to PS[n] of FIG. 2, or any one of the port switches PS[1] to PS[n] may be used as the L3 switching device.

In the example of FIG. 2, the information processing unit 13a and the information processing unit 13c described with reference to FIG. 1 are connected to the user port Pu[1] of the port switch PS[1] and the user port Pu[k] of the port switch PS[n], respectively. Also, in the information processing unit 13a, an IP (Internet Protocol) address "IP1" and a MAC (Media Access Control) address "MA1" are set to the tunnel end point EP1, and a virtual MAC address "MA11" is set to a virtual terminal VM[1,1]. In the information processing unit 13c, an IP address "IP2" and a MAC address "MA2" are set to the tunnel end point EP2, and a virtual MAC address "MA2i" is set to a virtual terminal VM[2,i].

Based on the premise described above, the operation example in which the inner L2 frame (hereinafter, abbreviated as inner frame) FL1 transmitted from the virtual terminal VM[1,1] is relayed to the virtual terminal VM[2,i] will be described. In this example, the tunnel end point EP is VTEP of VXLAN. Also, the same VXLAN identifier is assigned in advance to the virtual terminal VM[1,1] and the virtual terminal VM[2,i], and the virtual terminal VM[1,1] and the virtual terminal VM[2, i] are set so as to belong to the same logical (virtual) L2 network.

First, the tunnel end point EP1 determines the tunnel end point EP to which the virtual MAC address serving as the destination of the inner frame FL1 transmitted from the virtual terminal VM[1,1] belongs. Here, the fact that the virtual MAC address "MA2i" of the virtual terminal VM[2, 1] serving as the destination belongs to the tunnel end point EP2 having the IP address "IP2" and the MAC address "MA2" is learned in advance by the past communication. In this case, the tunnel end point EP1 encapsulates the inner frame FL1 with UDP and transmits the encapsulated frame FL2 containing the destination IP address "IP2" and the destination MAC address "MA2" to the port switch PS[1].

The box-type fabric system 12a relays the encapsulated frame FL2 received at the user port Pu[1] of the port switch PS[1] to the port switch PS[n] through a predetermined fabric switch FS. The port switch PS[n] relays the encapsulated frame FL2 to the user port Pu[k]. The tunnel end point EP2 receives the encapsulated frame FL2 transmitted from the port switch PS[n] and transmits the inner frame FL1 from which the encapsulation has been removed to the virtual terminal VM[2, i]. Also, though not shown, the tunnel end point EP2 learns the relation between the virtual MAC address "MA11" of the virtual terminal VM[1,1] serving as the source and the IP address "IP1" and the MAC address "MA1" of the tunnel end point EP1 to which the virtual terminal VM[1,1] belongs.

Figure 3A:
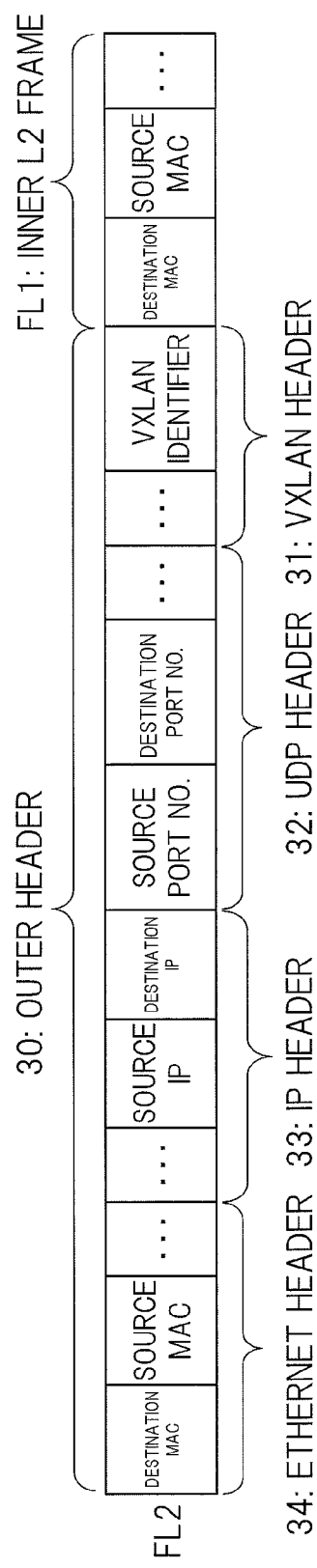
FIG. 3A is a diagram showing a configuration example of an encapsulated frame in FIG. 2.
Figure 3B:
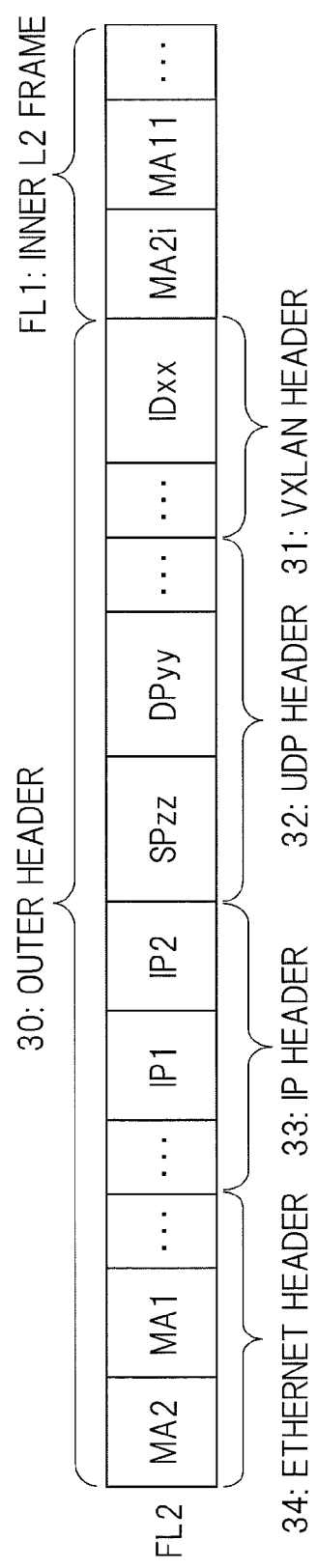
FIG. 3B is a diagram showing a specific example of FIG. 3A.

FIG. 3A is a diagram showing a configuration example of the encapsulated frame in FIG. 2 and FIG. 3B is a diagram showing a specific example of FIG. 3A. The case of using VXLAN is taken as an example here. As shown in FIG. 3A, the tunnel end point EP (here, VTEP) generates the encapsulated frame FL2 by adding an outer header 30 to the inner frame (inner L2 frame) FL1 from the virtual terminal VM which the tunnel end point EP itself manages. The inner frame FL1 contains a source MAC address and a destination MAC address.

The outer header 30 contains a VXLAN header 31, a UDP header 32, an IP header 33, and an Ethernet (registered trademark) header 34. The VXLAN header 31 is 8-byte information containing a 24-bit VXLAN identifier called VNI (VXLAN Network Identifier). The UDP header 32 is 8-byte information containing a 16-bit destination port number and a 16-bit source port number. The port number is a layer 4 (hereinafter, abbreviated as L4) port number of an OSI (Open Systems Interconnection) reference model. The IP header 33 is 20-byte information containing a 32-bit destination IP address and a 32-bit source IP address, and the Ethernet header 34 is 14 to 18-byte information containing a source MAC address and a destination MAC address.

FIG. 3B shows a specific example of FIG. 3A in the case of the communication from the virtual terminal VM[1,1] to the virtual terminal VM[2, i] described with reference to FIG. 2. As shown in FIG. 3B, the source MAC address of the inner frame (inner L2 frame) FL1 is the virtual MAC address "MA11" of the virtual terminal VM[1, 1], and the destination MAC address of the inner frame FL1 is the virtual MAC address "MA2i" of the virtual terminal VM[2, i]. As the VXLAN identifier of the VXLAN header 31, a predetermined identifier "IDxx" assigned to the virtual terminal VM[1,1] in advance is set.

A predetermined port number "DPyy" is set to the destination port number of the UDP header 32, and a predetermined port number "SPzz" is set to the source port number of the UDP header 32. Here, though not particularly limited, the tunnel end point EP1 sets a well-known port number as "DPyy" and sets a value calculated by hashing operation of the inner frame FL1 as "SPzz". The IP address "IP2" of the tunnel end point EP2 is set to the destination IP address of the IP header 33, and the IP address "IP1" of the tunnel end point EP1 is set to the source IP address of the IP header 33. The MAC address "MA1" of the tunnel end point EP1 is set to the source MAC address of the Ethernet header 34, and the MAC address "MA2" of the tunnel end point EP2 is set to the destination MAC address of the Ethernet header 34.

<<Operation of Network Relay System (Comparative Example)>>

Next, as a comparative example, the case where the virtual environment as shown in FIG. 2 is not used and the information processing units 13a and 13b of FIG. 2 are composed of general L2 switching devices and a plurality of terminals connected thereto is assumed. In this case, for example, when the port switch PS[1] in the box-type fabric system 12a receives a frame at the user port Pu[1], it performs the hashing operation based on the IP address or the MAC address in the frame and relays the frame to the link 21 determined based on the result of the hashing operation from the LAG 20a. More specifically, since the IP address or the MAC address in the frame are the IP address or the MAC address of the terminal, the efficient load distribution in the LAG 20a can be achieved in accordance with the combination of the source terminal and the destination terminal.

However, in the case where the virtual environment as shown in FIG. 2 is used, as shown in FIG. 3B, the address of the tunnel end point EP is set as the source IP address and destination IP address or the source MAC address and destination MAC address to the encapsulated frame FL2 received at the user port Pu[1] of the port switch PS[1]. As a result, when the communication is carried out from any one of the virtual terminals VM[1,1] to VM[1, i] to any one of the virtual terminals VM[2,1] to VM[2, i], the port switch PS[1] constantly selects the same link 21 from among the LAG 20a.

<<Operation of Network Relay System (First Embodiment)>>

Figure 4:
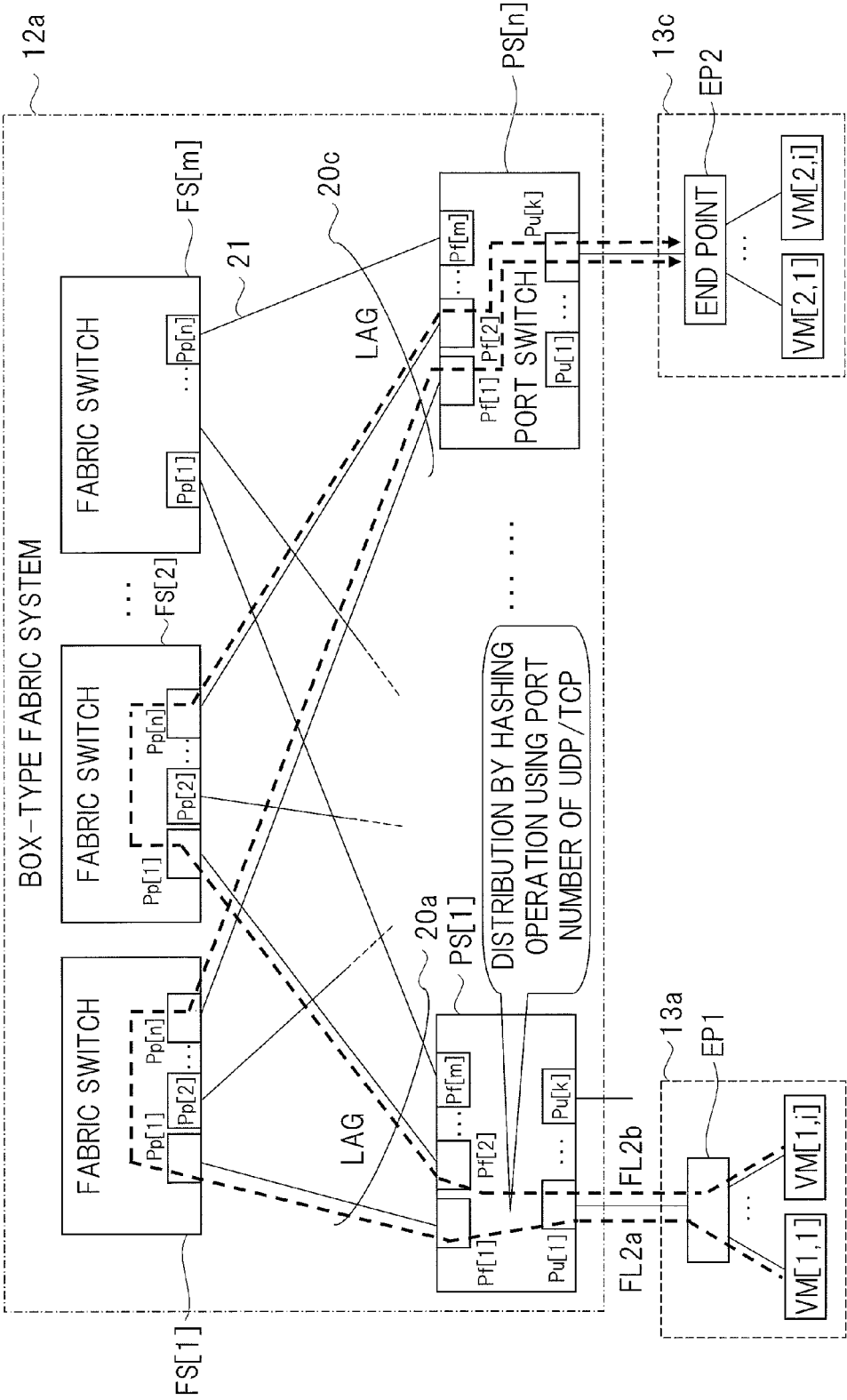
FIG. 4 is an explanatory diagram showing an operation example of the box-type fabric system of FIG. 2.

Thus, the network relay system of the first embodiment (box-type fabric system 12a) carries out the operation described below. FIG. 4 is an explanatory diagram showing an operation example of the box-type fabric system of FIG. 2. In FIG. 4, the illustration of the port switch PS[2] in the box-type fabric system 12a is omitted with respect to FIG. 2 as a matter of convenience. Here, the case where the communication is carried out from any one of the virtual terminals VM[1,1] to VM[1, i] included in the information processing unit 13a to any one of the virtual terminals VM[2,1] to VM[2, i] included in the information processing unit 13c is taken as an example.

Any one of the n port switches PS (port switch PS[1] in this example) performs the hashing operation for the encapsulated frame received at a predetermined port (here, user port Pu[1]) by using the above-mentioned L4 (here, UDP) port number. Then, any one of the n port switches PS (PS[1]) determines one link based the result of the hashing operation from among the m links 21 to which the LAG 20a is set, and relays the encapsulated frame to the determined one link. This process is executed in a LAG distribution control unit 41 in FIG. 5 described later.

As a result, the port switch PS[1] relays the frame FL2a whose source is the virtual terminal VM[1,1] and which is encapsulated in the tunnel end point EP1 to the port switch PS[n] through, for example, the fabric switch FS[1]. Also, the port switch PS[1] relays the frame FL2b whose source is the virtual terminal VM[1,i] and which is encapsulated in the tunnel endpoint EP1 to the port switch PS[n] through, for example, the fabric switch FS[2] unlike the case of the virtual terminal VM[1,1].

As described above, since the port switch PS (PS[1]) performs the hashing operation based on the L4 port number of the OSI reference model, the efficient load distribution can be achieved in the LAG (LAG 20a) even when the encapsulation by the tunnel end point EP (EP1) is performed. As a result, the communication band in the network relay system can be improved. Though not particularly limited, specifically, when the source port number "SPzz" in the UDP header 32 shown in FIG. 3B is determined by the hashing operation of the source MAC address and the destination MAC address in the inner frame FL1, the value of "SPzz" is changed in accordance with the combination of the source virtual terminal VM and the destination virtual terminal VM. In this case, the port switch PS (PS[1]) performs the hashing operation by using this "SPzz".

Note that various methods other than that described above may be employed as the determination method of the L4 port number in the encapsulated frame, and the method may be changed in accordance with the tunneling protocol to be used. The determination method is not particularly limited as long as at least one or both of the L4 source port number and the L4 destination port number are changed by the virtual terminal VM serving as the source, the virtual terminal VM serving as the destination or the combination thereof. Also, the port number used for the hashing operation of the LAG is not limited to the UDP (L4) port number, and the L4 TCP (Transmission Control Protocol) port number can also be used. More specifically, for example, a tunneling protocol such as STT employs the method of performing the encapsulation with TCP, and when STT is applied to the network system of FIG. 1, the TCP port number is used for the hashing operation of the LAG.

In FIG. 4, the case where any one of the n port switches PS (port switch PS[1]) performs the hashing operation by using the L4 port number is shown, but actually, the configuration in which all of the n port switches PS[1] to PS[n] perform the hashing operation in the same way is desirable. More specifically, the LAG distribution control unit 41 of FIG. 5 described later is desirably provided in all of the n port switches PS[1] to PS[n]. In this manner, since the load distribution similar to the case of the port switch PS[1] can be achieved in all of the n port switches PS[1] to PS[n] of FIG. 4, the communication band can be further improved. Moreover, in conjunction with this load distribution, all of the m fabric switches FS[1] to FS[m] can learn the MAC address of the tunnel end point EP, and therefore the flooding due to the aging of the address table is less likely to occur in each of the fabric switches FS.

With respect to the aging of the address table, it is more desirable that all of the n port switches PS[1] to PS[n] perform the hashing operation in the same way and determine one link 21 from among the LAG with the same rule. In this manner, it becomes easy to form the configuration in which the bidirectional communication between two virtual terminals VM passes through the same fabric switch FS. In this case, since this fabric switch FS can learn the MAC addresses of the two tunnel end points EP corresponding to the two virtual terminals at a relatively high frequency, the flooding due to the aging of the destination MAC address is further less likely to occur.

Specifically, for example, when the source port number "SPzz" in the UDP header 32 shown in FIG. 3B is determined by the hashing operation of the source MAC address and the destination MAC address in the inner frame FL1, the same port number "SPzz" is calculated for the combination of the two virtual terminals VM serving as the source and the destination. In this case, if all of the n port switches PS[1] to PS[n] perform the load distribution in the LAG with the same rule, the bidirectional communication between the two virtual terminals VM passes through the same fabric switch FS.

Furthermore, in the description of FIG. 4, the communication between the information processing unit 13a and the information processing unit 13c in FIG. 1 is taken as an example, but the communication between the information processing unit 13a and the information processing unit 13b can be carried out in the same manner, and further the communication between the information processing unit 13a and the information processing unit 13d through the L3 network 10 can be carried out in the same manner.

In the communication between the information processing unit 13a and the information processing unit 13d, the encapsulated frame is relayed between the tunnel end point EP1 and the tunnel end point EP3. At this time, the encapsulated frame is relayed based on the IP header 33 of FIG. 3A between the L3 switch (L3SW) 11a and the L3 switch (L3SW) 11b of FIG. 1. The L3 switch (L3SW) 11a is connected to any one of the port switches PS[2] to PS[n−1] (not shown) of FIG. 4 or mounted on any one of the port switches PS[2] to PS[n−1] (not shown). When the communication is carried out between the port switch PS[1] and the port switch PS corresponding to the L3 switch (L3SW) 11a, the load distribution in the LAG is performed in the same manner as the case of FIG. 4.

<<Schematic Configuration of Port Switch (First Switching Device)>>

Figure 5:
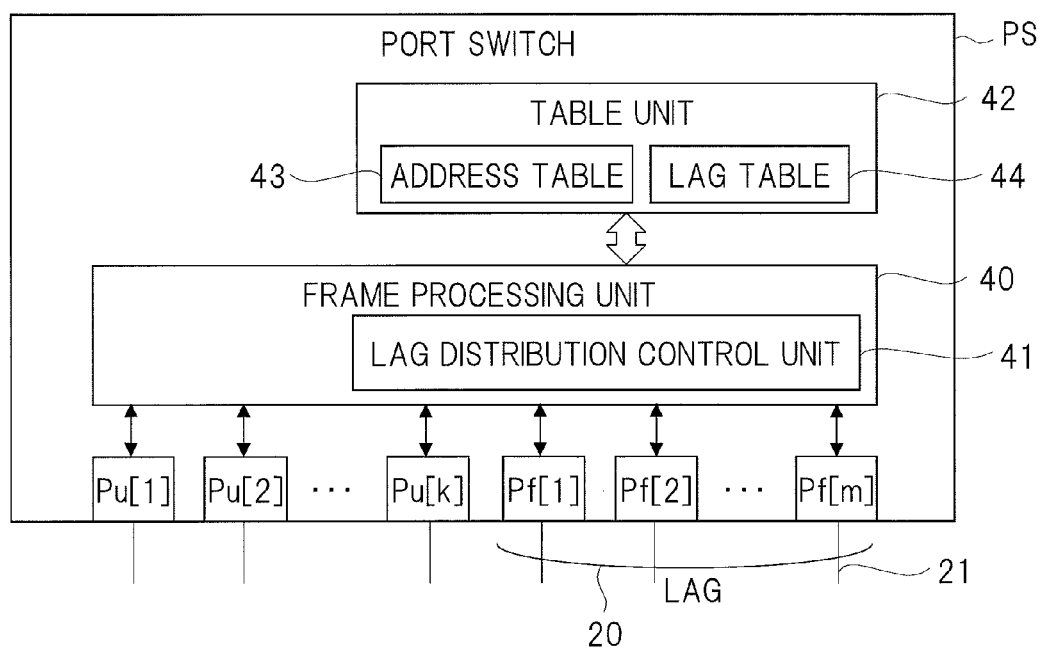
FIG. 5 is a block diagram showing a schematic configuration example of a main part of a port switch in the network relay system of FIG. 2.

FIG. 5 is a block diagram showing a schematic configuration example of a main part of a port switch in the network relay system of FIG. 2. The port switch (first switching device) PS shown in FIG. 5 includes, for example, a frame processing unit 40, a table unit 42, a plurality of ports (user ports Pu[1] to Pu[k] and fabric-switch ports Pf[1] to Pf[m]) and others. The information processing units 13 of FIG. 1 are properly connected to the user ports Pu[1] to Pu[k] through the communication lines. The fabric switches FS[1] to FS[m] are connected to the fabric-switch ports Pf[1] to Pf[m], respectively, through the communication lines. In other words, the port switch PS and the fabric switches FS[1] to FS[m] are connected by the m links 21.

The table unit 42 includes an address table 43 and a LAG table 44. The address table 43 is a table showing the relation between each port and the MAC address present ahead of each port. The LAG table 44 is a table showing which link 21 (actually, port corresponding to the link 21) the LAG is set to. The LAG table 44 can be fixedly set in advance by an administrator or the like or can be automatically set by using the method described in the Patent Document 1. In this example, the LAG 20 is set to the m links 21 including the fabric-switch ports Pf[1] to Pf[m].

The frame processing unit 40 includes the LAG distribution control unit 41 and controls the relay of the frame between respective ports based on the address table 43 and the LAG table 44. At this time, the LAG distribution control unit 41 recognizes the ports to which the LAG 20 is set based on the LAG table 44, and controls the distribution of the frames in the LAG by using the hashing operation described with reference to FIG. 4. More specifically, the LAG distribution control unit 41 performs the hashing operation for the frame received at a predetermined port (user port Pu) and containing a L4 port number by using the port number, and determines the one link 21 based on the result of the hashing operation from among the m links 21 to which the LAG 20 is set.

FIG. 6A is a schematic diagram showing a configuration example of the address table in FIG. 5 and FIG. 6B is a schematic diagram showing a configuration example of the LAG table in FIG. 5. The LAG table 44 shown in FIG. 6B indicates that the ports corresponding to the links 21 to which the LAG 20 is set as a LAG identifier (LAG ID) (hereinafter, referred to as LAG port) are the fabric-switch ports Pf[1] to Pf[m]. In this example, the LAG table 44 indicates also the state (that is, presence of fault) of each link 21 corresponding to each of the fabric-switch ports Pf[1] to Pf[m]. For example, when the frame processing unit 40 of FIG. 5 detects a fault of the fabric-switch ports Pf[1] to Pf[m] by the regular transmission and reception of a control frame, it records the information to the LAG table 44. The LAG distribution control unit 41 determines one link 21 from among the normal links 21 based on the LAG table 44.

The address table 43 shown in FIG. 6A indicates the relation between the port No./LAG ID and the MAC addresses present ahead of the port corresponding to the port No. and present ahead of the LAG port corresponding to the LAG ID. For example, in the case of the port switch PS[1] described with reference to FIG. 2, the address table 43 indicates that the MAC address "MA1" is present ahead of the user port Pu[1] and the MAC address "MA2" is present ahead of the LAG port corresponding to the LAG 20a.

FIG. 7 is a flowchart showing a main operation example of the frame processing unit in FIG. 5. As shown in FIG. 7, in the frame relaying process, the frame processing unit 40 first receives a frame at a port (step S101). Next, the frame processing unit 40 executes the process of the address table 43 (step S102). Specifically, the frame processing unit 40 updates the address table 43 based on the port which has received the frame and the source MAC address contained in the frame and then retrieves the destination port corresponding to the destination MAC address contained in the frame based on the address table 43.

Here, when the destination port is the user port Pu (step S103), the frame processing unit 40 relays the frame to the destination user port Pu (step S104). Meanwhile, when the destination port is the LAG (step S105), the frame processing unit 40 first recognizes the LAG port (here, a plurality of fabric-switch ports Pf) based on the LAG table 44 (step S106). Next, the LAG distribution control unit 41 calculates the distribution identifier by performing the hashing operation using the port number of UDP/TCP as described above, and determines the link 21 (fabric-switch port Pf) corresponding to the distribution identifier (step S107). The frame processing unit 40 relays the frame to the fabric-switch port Pf corresponding to the distribution identifier (step S108).

Meanwhile, when the destination port is neither the user port Pu nor the LAG (step S103 and step S105), in other words, when the destination MAC address is not present in the address table 43, the frame processing unit 40 performs the flooding (step S109).

<<Schematic Configuration of LAG Distribution Control Unit>>

Figure 8:
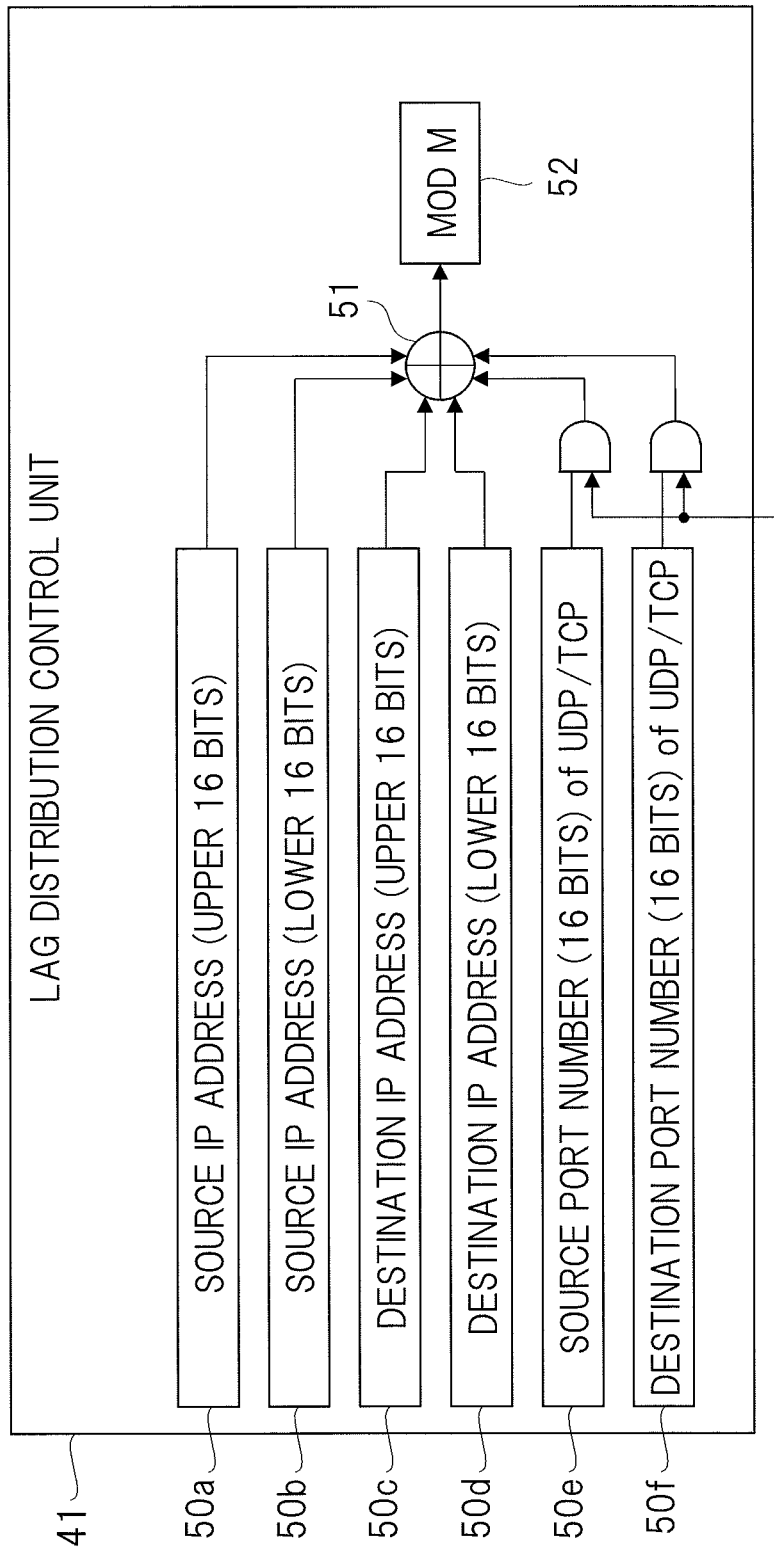
FIG. 8 is a diagram showing a schematic configuration example of a main part of a LAG distribution control unit in FIG. 5.

FIG. 8 is a diagram showing a schematic configuration example of a main part of the LAG distribution control unit in FIG. 5. The LAG distribution control unit 41 shown in FIG. 8 includes, for example, a plurality of registers 50*a* to 50*f*, an exclusive OR operation unit 51 and a remainder operation unit 52. The register 50*a* and the register 50*b* store upper 16 bits and lower 16 bits of the source IP address contained in the received frame, respectively. The register 50*c* and the register 50*d* store upper 16 bits and lower 16 bits of the destination IP address contained in the received frame, respectively. The register 50*e* stores the source port number (16 bits) of UDP/TCP and the register 50*f* stores the destination port number (16 bits) of UDP/TCP.

The exclusive OR operation unit 51 receives the values of the plurality of registers 50*a* to 50*f* to calculate the exclusive OR (EXOR) of each bit. The remainder operation unit 52 divides the operation result (16 bits) of the exclusive OR operation unit 51 by a predetermined constant "M" to obtain the remainder thereof. The value of this remainder becomes the distribution identifier described in the step S106 of FIG. 7. The LAG distribution control unit 41 determines one link 21 from among the m links 21 in the LAG in accordance with this distribution identifier.

Furthermore, the LAG distribution control unit 41 of FIG. 8 has the configuration capable of selecting the inputs of the exclusive OR operation unit 51 from between the registers 50*a* to 50*f* and the registers 50*a* to 50*d* by a valid/invalid switching instruction 53. More specifically, in this configuration, it is possible to select a first mode in which the hashing operation is performed by using the source IP address and the destination IP address in addition to the port number of UDP/TCP and a second mode in which the hashing operation is performed by using the source IP address and the destination IP address without using the port number. The valid/invalid switching instruction 53 is issued by in-band management or from outside by using a management port (not shown in FIG. 5).

As described above, by providing the first mode and the second mode selectable from outside, the box-type fabric system 12 of FIG. 1 can be easily applied to various communication environments. For example, in the case where the box-type fabric system 12 of FIG. 1 is not applied to the virtual environment shown in FIG. 1, the more efficient distribution in the LAG can be sometimes achieved when the hashing operation is performed by using the source IP address and the destination IP address (that is, the second mode).

At this time, by using the source IP address and the destination IP address, the communication between two terminals can be made to pass through the same fabric switch FS in the same manner as described with reference to FIG. 4, and therefore the degradation in communication band due to flooding can be suppressed. From this viewpoint, not only the combination of the source IP address and the destination IP address (first combination) but the combination of the source MAC address and the destination MAC address (second combination) can be used. Also, the LAG distribution control unit 41 of FIG. 8 can be implemented by both of hardware and software, but it is desirable to implement it by hardware such as FPGA (Field Programmable Gate Array) from the viewpoint of speeding up.

As described above, by using the network relay system and the switching device of the first embodiment, typically, the communication band can be improved.

(Second Embodiment)

<<Configuration and Operation of Network Relay System (Modified Example)>>

Figure 9:
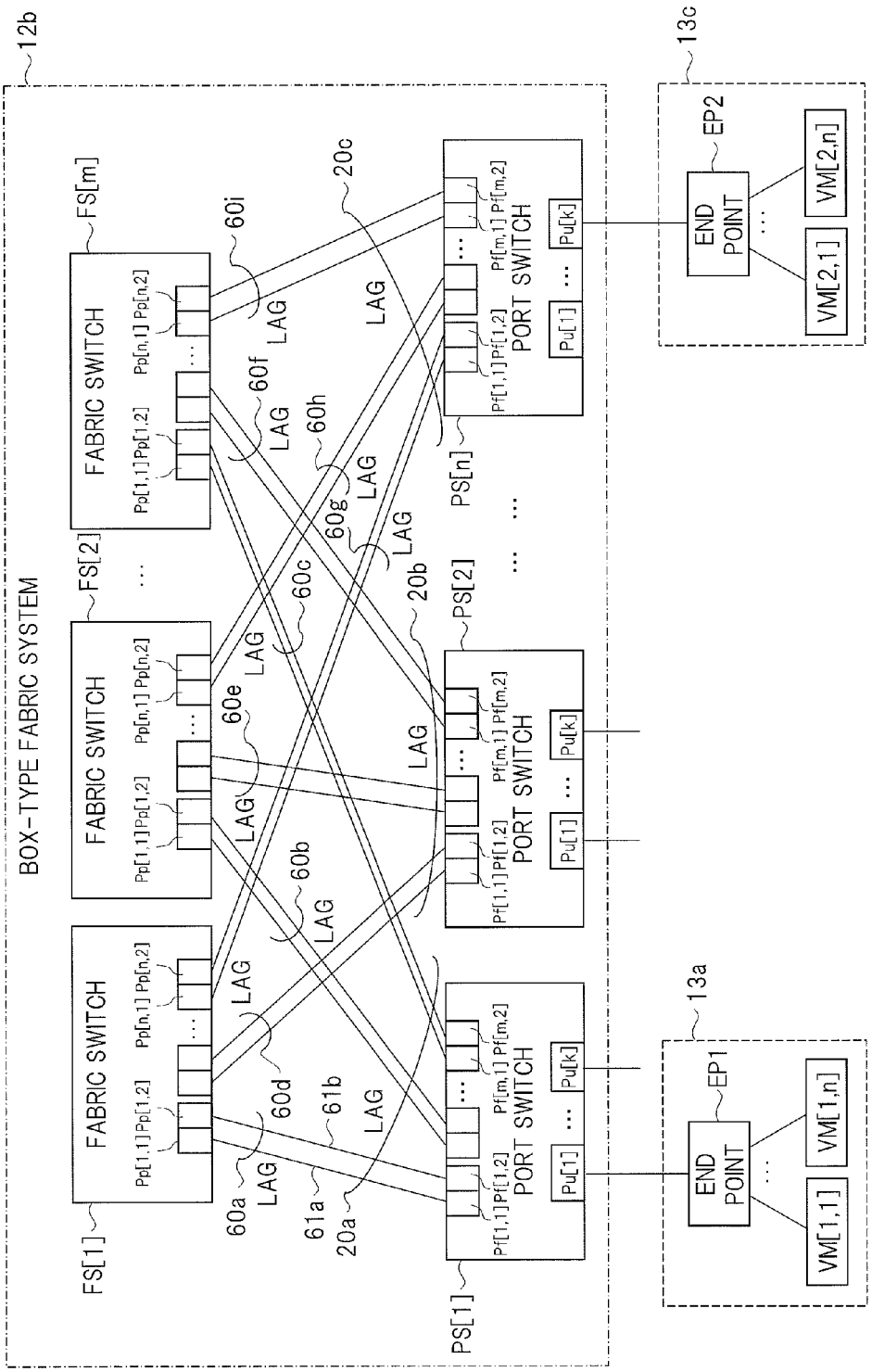
FIG. 9 is a block diagram showing a configuration example of a network relay system according to the second embodiment of the present invention.

FIG. 9 is a block diagram showing a configuration example of a network relay system according to the second embodiment of the present invention. The box-type fabric system (network relay system) 12*b* shown in FIG. 9 is different from the box-type fabric system 12*a* of FIG. 2 in that each of the links 21 between each port switch PS and each fabric switch FS of FIG. 2 is composed of a plurality of (here, two) sub-links 61*a* and 61*b*. Since the configuration other than that is identical to that of FIG. 2, the detailed description thereof will be omitted.

In FIG. 9, each of the m fabric-switch ports Pf[1] to Pf[m] included in each port switch PS of FIG. 2 is composed of two fabric-switch ports. For example, the fabric-switch port Pf[1] is composed of two fabric-switch ports Pf[1,1] and Pf[1, 2], and the fabric-switch port Pf[m] is composed of two fabric-switch ports Pf[m, 1] and Pf[m, 2]. Similarly, each of the n port-switch ports Pp[1] to Pp[n] included in each fabric switch FS of FIG. 2 is also composed of two port-switch ports. For example, the port-switch port Pp[1] is composed of two port-switch ports Pp[1,1] and Pp[1, 2], and the port-switch port Pp[n] is composed of two port-switch ports Pp[n, 1] and Pp[n, 2].

In accordance with this, the port switch PS[1] is connected to the m fabric switches FS[1] to FS[m] through each of the pairs of two sub-links 61*a* and 61*b*, and sets LAG to each pair of the sub-links 61*a* and 61*b*. For example, the port switch PS[1] sets LAG 60*a* to the pair of the sub-links 61*a* and 61*b* corresponding to the fabric switch FS[1], sets LAG 60*b* to the pair of the sub-links 61*a* and 61*b* corresponding to the fabric switch FS[2], and sets LAG 60*c* to the pair of the sub-links 61*a* and 61*b* corresponding to the fabric switch FS[m].

The same is true of the port switches PS[2] to PS[n]. For example, the port switch PS[2] sets LAG 60*d* to the pair of the sub-links 61*a* and 61*b* corresponding to the fabric switch FS[1], sets LAG 60*e* to the pair of the sub-links 61*a* and 61*b* corresponding to the fabric switch FS[2], and sets LAG 60*f* to the pair of the sub-links 61*a* and 61*b* corresponding to the fabric switch FS[m]. The port switch PS[n] sets LAG 60*g* to the pair of the sub-links 61*a* and 61*b* corresponding to the fabric switch FS[1], sets LAG 60*h* to the pair of the sub-links 61*a* and 61*b* corresponding to the fabric switch FS[2], and sets LAG 60*i* to the pair of the sub-links 61*a* and 61*b* corresponding to the fabric switch FS[m]. Also, not only on the side of the port switch PS but on the side of the fabric switches FS[1] to FS[m], LAGs 60a to 60i are set to the pairs of the sub-links 61a and 61b corresponding to the LAGs 60a to 60i described above.

When the configuration example like this is used, for example, the port switch PS[1] operates in the state where the LAG 20a is set to the m pairs of the sub-links 61a and 61b between the port switch PS[1] and the m fabric switches FS[1] to FS[m] and the LAG 20 (60a to 60c and other) is set to each of the m pairs of the sub-links 61a and 61b. As a result, the port switch PS[1] can relay the received frames to each of the fabric switches FS[1] to FS[m] in a properly distributed manner, and also can relay the frames to respective fabric switches FS in a properly distributed manner. Consequently, the further improvement in the communication band and the improvement in fault tolerance can be achieved.

For example, when the box-type fabric system 12a of FIG. 2 is used and a fault occurs in the link 21 between the port switch PS[1] and the fabric switch FS[1], the other port switches PS[2] to PS[n] cannot detect the fault in some cases. In this case, in order to prevent the frame directed to the port switch PS[1] from the port switches PS[2] to PS[n] from passing through the fabric switch FS[1], the operation of the fabric switch FS[1] itself needs to be invalidated in some cases. This event will lead to the degradation in the communication band and the decrease in the fault tolerance. On the other hand, when the box-type fabric system 12b of FIG. 9 is used, such a need does not arise if one of the sub-links 61a and 61b is normal.

Note that, when the box-type fabric system 12b of FIG. 9 is used, for example, the LAG distribution control unit 41 in the port switch PS[1] shown in FIG. 5 properly assigns the (m×2) sub-links (61a and 61b) included in the LAG 20a of FIG. 9 to the distribution identifier in the step S107 and the step S108 of FIG. 7. Also, although the case where each link is composed of two sub-links has been taken as an example, the link may of course be composed of three or more sub-links.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A network relay system, comprising:
n (n is an integer of 2 or more) first switching devices;
m (m is an integer of 2 or more) second switching devices functioning to relay a frame between the n first switching devices; and
a plurality of links which connect the m second switching devices and the n first switching devices, respectively, wherein each of the n first switching devices sets a link aggregation group to m links which connect the n first switching devices and the m second switching devices, and
any one of the n first switching devices includes a LAG distribution control unit which performs a hashing operation for a frame received at a predetermined port and containing a layer 4 port number of an OSI reference model by using the layer 4 port number and determines one link based on a result of the hashing operation from among the m links to which the link aggregation group is set, and the first switching device relays the frame to the one link determined by the LAG distribution control unit,
the LAG distribution control unit performs the hashing operation by using, in addition to the layer 4 port number, a first combination including a source IP address and a destination IP address contained in the frame or a second combination including a source MAC address and a destination MAC address, the layer 4 port number is a source port number and/or a destination port number contained in a UDP header or a TCP header which is a L4 header, and
the LAG distribution control unit is provided with a first mode in which the hashing operation is performed by using the first combination or the second combination in addition to the layer 4 port number and a second mode in which the hashing operation is performed by using the same combination as that of the first mode out of the first combination and the second combination without using the layer 4 port number, the first mode and the second mode are selectable, and a circuit which selects the first mode and the second mode.

2. The network relay system according to claim 1, wherein the LAG distribution control unit is provided in all of the n first switching devices.

3. The network relay system according to claim 2, further comprising:
a tunnel end point which is connected to any one of the first switching devices and manages a plurality of virtual terminals,
wherein the tunnel end point encapsulates an inner frame generated by the virtual terminal by an outer header containing a layer 4 header of an OSI reference model and transmits it to the first switching device.

4. A switching device which is connected to m (m is an integer of 2 or more) other switching devices by m links and sets a link aggregation group to the m links, the switching device comprising:
a LAG distribution control unit which performs a hashing operation for a frame received at a predetermined port and containing a layer 4 port number of an OSI reference model by using the layer 4 port number and determines one link based on a result of the hashing operation from among the m links to which the link aggregation group is set,
wherein the frame is relayed to the one link determined by the LAG distribution control unit,
the LAG distribution control unit performs the hashing operation by using, in addition to the layer 4 port number, a first combination including a source IP address and a destination IP address contained in the frame or a second combination including a source MAC address and a destination MAC address, the layer 4 port number is a source port number and/or a destination port number contained in a UDP header or a TCP header which is a L4 header, and the LAG distribution control unit is provided with a first mode in which the hashing operation is performed by using the first combination or the second combination in addition to the layer 4 port number and a second mode in which the hashing operation is performed by using the same combination as that of the first mode out of the first combination and the second combination without using the layer 4 port number, the first mode and the second mode are selectable, and the a circuit which selects the first mode and the second mode.

5. The switching device according to claim 4,
wherein the frame received at the predetermined port is a frame obtained by encapsulating an inner frame generated by a virtual terminal by an outer header containing a layer 4 header of an OSI reference model.

* * * * *